(12) United States Patent
Tecu

(10) Patent No.: US 11,768,804 B2
(45) Date of Patent: Sep. 26, 2023

(54) DEEP SEARCH EMBEDDING OF INFERRED DOCUMENT CHARACTERISTICS

(71) Applicant: Konica Minolta Business Solutions U.S.A., Inc., San Mateo, CA (US)

(72) Inventor: Kirk Steven Tecu, Longmont, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 473 days.

(21) Appl. No.: 15/940,794

(22) Filed: Mar. 29, 2018

(65) Prior Publication Data

US 2019/0303452 A1  Oct. 3, 2019

(51) Int. Cl.
*G06F 16/14* (2019.01)
*G06F 16/80* (2019.01)
*G06F 16/16* (2019.01)
*G06F 16/33* (2019.01)

(52) U.S. Cl.
CPC .......... *G06F 16/148* (2019.01); *G06F 16/164* (2019.01); *G06F 16/3334* (2019.01); *G06F 16/80* (2019.01)

(58) Field of Classification Search
CPC ...... G06F 16/148; G06F 16/80; G06F 16/164; G06F 16/3334
See application file for complete search history.

(56) References Cited

U.S. PATENT DOCUMENTS

| | | | |
|---|---|---|---|
| 2004/0199876 A1* | 10/2004 | Ethier | G06F 40/117 715/236 |
| 2006/0085442 A1* | 4/2006 | Fujiwara | G06F 16/907 |
| 2006/0179405 A1* | 8/2006 | Chao | G06F 40/186 715/209 |
| 2006/0248091 A1* | 11/2006 | Yamamoto | G06F 16/3334 |
| 2007/0143286 A1* | 6/2007 | Kim | G06F 16/164 |
| 2007/0219986 A1* | 9/2007 | Egozi | G06F 16/313 |
| 2007/0239712 A1* | 10/2007 | Chen | G06F 16/156 |
| 2008/0201636 A1* | 8/2008 | Fujiwara | G06K 9/00442 715/700 |
| 2008/0263023 A1* | 10/2008 | Vailaya | G06F 16/148 |
| 2009/0019074 A1* | 1/2009 | Hino | H04N 1/32101 |
| 2009/0150359 A1* | 6/2009 | Masuyama | G06F 16/5854 |
| 2009/0228777 A1* | 9/2009 | Henry | G06F 16/40 715/230 |
| 2009/0292678 A1* | 11/2009 | Kawanishi | G06F 40/174 |
| 2010/0082709 A1* | 4/2010 | Yamamoto | G06F 16/93 707/812 |

(Continued)

*Primary Examiner* — Pierre M Vital
*Assistant Examiner* — Andrew N Ho
(74) *Attorney, Agent, or Firm* — Osha Bergman Watanabe & Burton LLP

(57) ABSTRACT

A method for generating a searchable file from a document. The method includes identifying an object within the document and a formatting attribute of the object, determining an inferred semantic characteristic of the object by comparing the formatting attribute with a plurality of inference rules, wherein the inferred semantic characteristic comprises an estimation of author-defined semantic characteristic of the object, generating metadata based at least on the inferred semantic characteristic and the formatting attribute of the object, wherein the metadata comprises text data that is searchable by a search application for the searchable file to identify the object within the searchable file, and generating, based on the document, the searchable file comprising the metadata.

26 Claims, 9 Drawing Sheets

(56) References Cited

U.S. PATENT DOCUMENTS

| | | | | |
|---|---|---|---|---|
| 2010/0231938 A1* | 9/2010 | Ohguro | ............... | G06F 40/103 |
| | | | | 358/1.9 |
| 2011/0231189 A1* | 9/2011 | Anastasiadis | ........... | G10L 15/26 |
| | | | | 704/243 |
| 2011/0314006 A1* | 12/2011 | Sweeney | ............ | G06Q 30/0277 |
| | | | | 707/723 |
| 2014/0193047 A1* | 7/2014 | Grosz | ................... | G06Q 10/10 |
| | | | | 382/118 |
| 2014/0245115 A1* | 8/2014 | Zhang | ................ | G06F 3/04842 |
| | | | | 715/202 |
| 2015/0033116 A1* | 1/2015 | McKinney | ............. | G06F 40/14 |
| | | | | 715/239 |
| 2015/0154232 A1* | 6/2015 | Ovsjanikov | ........... | G06F 16/532 |
| | | | | 707/780 |
| 2018/0061074 A1* | 3/2018 | Yamamichi | ........ | G06K 9/00463 |

* cited by examiner

DEEP SEARCH EMBEDDING OF INFERRED DOCUMENT CHARACTERISTICS

BACKGROUND

Electronic documents (hereinafter simply "documents") are used by computing device users to store, share, archive, and search information. Such documents are stored, temporarily or permanently, in files. Many different file formats exist. Each file format defines how the content of the file is encoded. Regardless of file formats of the file, semantic content implied by the author may not be specified and, therefore, not searchable.

SUMMARY

In general, in one aspect, the invention relates to a method for generating a searchable file from a document. The method includes identifying an object within the document and a formatting attribute of the object, determining an inferred semantic characteristic of the object by comparing the formatting attribute with a plurality of inference rules, wherein the inferred semantic characteristic comprises an estimation of author-defined semantic characteristic of the object, generating metadata based at least on the inferred semantic characteristic and the formatting attribute of the object, wherein the metadata comprises text data that is searchable by a search application for the searchable file to identify the object within the searchable file, and generating, based on the document, the searchable file comprising the metadata.

In general, in one aspect, the invention relates to a system for generating a searchable file from a document. The system includes a computer processor and memory coupled to the computer processor and storing instructions, when executed, causing the computer processor to identify an object within the document and a formatting attribute of the object, determine an inferred semantic characteristic of the object by comparing the formatting attribute with a plurality of inference rules, wherein the inferred semantic characteristic comprises an estimation of author-defined semantic characteristic of the object, generate metadata based at least on the inferred semantic characteristic and the formatting attribute of the object, wherein the metadata comprises text data that is searchable by a search application for the searchable file to identify the object within the searchable file, and generate, based on the document, the searchable file comprising the metadata.

In general, in one aspect, the invention relates to a non-transitory computer readable medium comprising instructions for generating a searchable file from a document. The instructions, when executed, being configured to identify an object within the document and a formatting attribute of the object, determine an inferred semantic characteristic of the object by comparing the formatting attribute with a plurality of inference rules, wherein the inferred semantic characteristic comprises an estimation of author-defined semantic characteristic of the object, generate metadata based at least on the inferred semantic characteristic and the formatting attribute of the object, wherein the metadata comprises text data that is searchable by a search application for the searchable file to identify the object within the searchable file, and generate, based on the document, the searchable file comprising the metadata.

Other aspects of the invention will be apparent from the following description and the appended claims.

DETAILED DESCRIPTION

Figure 1:
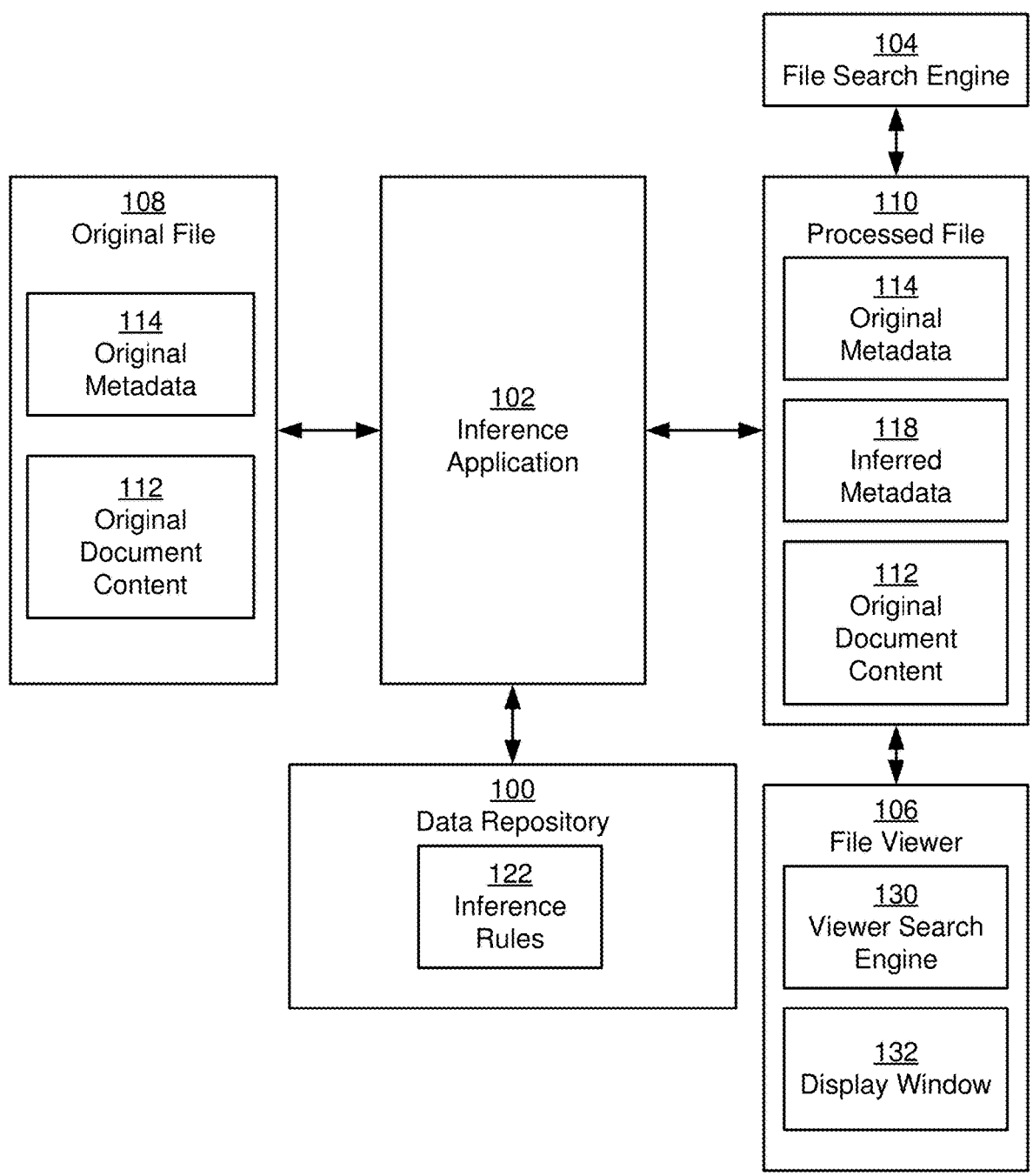
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for embedding inferred information from structured input sources or unstructured input sources. The recognized object information is tagged, e.g., specified as OOXML tags, or some other standard. The embedding of the additional inferred data may be embedded near the inferred object, or in other ways, such as in a document property. Further, the final document with inferred information embedding may be in OOXML, PDF, or any other file format that allows searching through standard text searching tools in an operating system or software application.

FIG. 1 shows a schematic diagram of a system in accordance with one or more embodiments of the invention. As shown in FIG. 1, the system may include an inference application (102), a data repository (100), a file search engine (104), and a file viewer (106). An original file (108) and a processed file (110) are also shown in FIG. 1. Each of the elements of FIG. 1 is discussed below.

The original file (108) is a file that is processed by the inference application (102) to generate the processed file (110). For example, the original file (108) may be in a word processor file format, a presentation file format, a spreadsheet file format, a graphics format, in hypertext markup language, or in another file format. In one or more embodiments, the original file (108) is a structured document such as a PDL, PDF, OOXML, etc. In one or more embodiments, the original file (108) is an unstructured document such as a bitmap image. The original file (108) may be temporarily or semi-permanently stored.

In one or more embodiments of the invention, the original file (108) includes original document content (112). The original document content (112) corresponds to the displayed data in the file. Specifically, the original document content (112) includes data that is displayed when a user views the original file (108). The original document content (112) includes objects. Each object is text, a graphical image, or other parts of the content that is displayable. Graphical images may include bitmap-based images and vector based graphical images. For example, a graphical image may be stylized text (e.g., word art), chart, pictorial image, or other graphics. In one or more embodiments, the objects in the original document content (112) are annotated with formatting attributes to describe how the objects are displayed. Formatting attributes may include color, shape, font, size, shading, image file name (e.g., puppy.jpg), location, and other such information. Type refers to what the object is. For example, a type may be a particular kind of chart, word art, text, image, table, clipart, bulleted list, and other such types. In one or more embodiments of the invention, charts, word art, images, and clipart may be referred to as graphical types.

In one or more embodiments of the invention, the formatting attributes of objects in the original file (108) are stored, or otherwise organized, as the original metadata (114). In addition, the original metadata (114) may also include author, creation time, edit time, security parameters, subject, "Title", file name, and other data about the original file as a whole.

The processed file (110) is an output of the inference engine (102). In one or more embodiments of the invention, the processed file (110) is generated by the inference engine (102) by inserting inferred metadata (118) into the original file (108). For example, the processed file (110) includes the original document content (112), the original metadata (114), and the inferred metadata (118). In other words, the processed file (110) corresponds to a processed version of the original file (108).

Inferred metadata (118) is metadata that describes an estimation of author-defined semantic characteristics of objects in the original document content (112). Specifically, an author-defined semantic characteristic is a semantic characteristic defined by the author of the original file (108). In one or more embodiments, the semantic characteristic describes a purpose of the object intended by the user, such as assigning a text string as the "Title" of the document. In one or more embodiments, the semantic characteristic describes author-selected or -created content of the object in the document, such as selecting/creating an image having a particular type of content (e.g., landscape, animal, portrait, etc. of a particular subject). In one or more embodiments, the estimation of author-defined semantic characteristics is generated by analyzing the formatting attribute(s) and/or content of the object using a computer-implemented inference algorithm. In this context, the inferred metadata describes computer-inferred purpose or computer-inferred content description of the object. In one or more embodiments, the computer-implemented inference algorithm is ruled-based and uses a set of inference rules (e.g., inference rules (122) described below) to infer, from the formatting attribute(s) and/or object content, the purpose and/or content of the object as intended by the author.

In one or more embodiments, a portion of the original metadata (114) describing a particular object is linked with a portion of the inferred metadata (118) that describes the same object. Accordingly, the inferred metadata of each object is linked with the location (i.e., part of formatting attributes) of each object, which may be specified, for example, by page number of the page in which the object is located and x and y coordinates on the page. In one or more embodiments of the invention, the inferred metadata (118) is not used to render the processed file (110) for display. In such embodiments, the inferred metadata (118) is for informational purposes. In other words, the inferred metadata (118) may be used exclusively for informational purposes, such as exclusively for searching in one or more embodiments of the invention. Although FIG. 1 shows the original metadata (114) and inferred metadata (118) as separate from the original document content (112), one or both of the original metadata (114) and inferred metadata (118) may be embedded in the original document content (112).

Continuing with FIG. 1, in one or more embodiments of the invention, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site. The data repository (100) may include functionality to store inference rules (122) in one or more embodiments of the invention.

Inference rules (122) specify, for each type of author-defined object purpose or author-defined object type, an empirical criterion for evaluating the formatting attribute(s) and/or object content. Specifically, each inference rule may specify how to evaluate the formatting attribute(s) and/or object content to estimate the corresponding author-defined semantic characteristic.

Continuing with FIG. 1, the inference application (102) corresponds to a software tool that includes functionality to generate the inferred metadata (118) from the original metadata (114) and/or original document content (112). In one or more embodiments of the invention, the inference application (102) is operatively connected to the inference rules (122) and includes functionality to perform the inference algorithm using the inference rules (122).

Continuing with FIG. 1, a file search engine (104) includes functionality to receive a search request specifying particular properties. The properties may include a description in inferred metadata (118), one or more portions of the original metadata (114), one or more objects in original document content (112), or a combination thereof. The file search engine (104) may further include functionality to identify and return one or more files that have the particular properties in the search request. In one or more embodiments of the invention, the file search engine (104) is a tool provided by an operating system.

In one or more embodiments of the invention, a file viewer (106) includes functionality to display a structured file or a unstructured file, such as the processed file (110). Specifically, the file viewer (106) may include functionality to read the processed file (110) and display the processed file (110) in the display window (132). The file viewer (106) includes a viewer search engine (130). The viewer search engine (130) includes functionality to receive a search request for a currently displayed structured file and/or unstructured file. The search request includes particular properties. The properties may include a description or portion thereof in metadata, one or more objects in content, or a combination thereof. The viewer search engine (130) may further include functionality to identify if an object has the properties in the search request and display the portion of the structured file and/or unstructured file having the object in the display window (132). The identified object may be shown as highlighted in the display window (132).

In one or more embodiments, the inferred metadata (118) includes textual description of computer-inferred purpose or computer-inferred content description of objects in the original document content (112). Accordingly, the processed file (110) is searchable by the viewer search engine (130) and/or the file search engine (104) matching the properties in the search request to the textual descriptions in the inferred metadata (118). In this context, the processed file (110) is a searchable file based on semantic information implicitly contained in the original document content (112). In other words, the processed file (110) is a semantic-searchable file.

In one or more embodiments of the invention, the viewer search engine (130) and/or the file search engine (104) may be standard tools. In such embodiments, the original metadata (114) and inferred metadata (118) may be invisible or hidden strings that overlay or are in proximity to the objects. In other words, in such embodiments, the original metadata (114) and inferred metadata (118) may be a part of the processed file (110) that is not visible to the user when viewing the processed file (110).

Although FIG. 1 shows a single file, the file may be composed of multiple files. Each of the multiple files may include the encoding in the original file format for at least one of the objects.

While FIG. 1 shows one particular configuration of components, other configurations may be used without departing from the scope of the invention. For example, various components may be combined to create a single component. For example, the inference rules (124) may be a part of the inference application (102) without departing from the scope of the invention. As another example, the functionality performed by a single component may be performed by two or more components.

Figure 2:
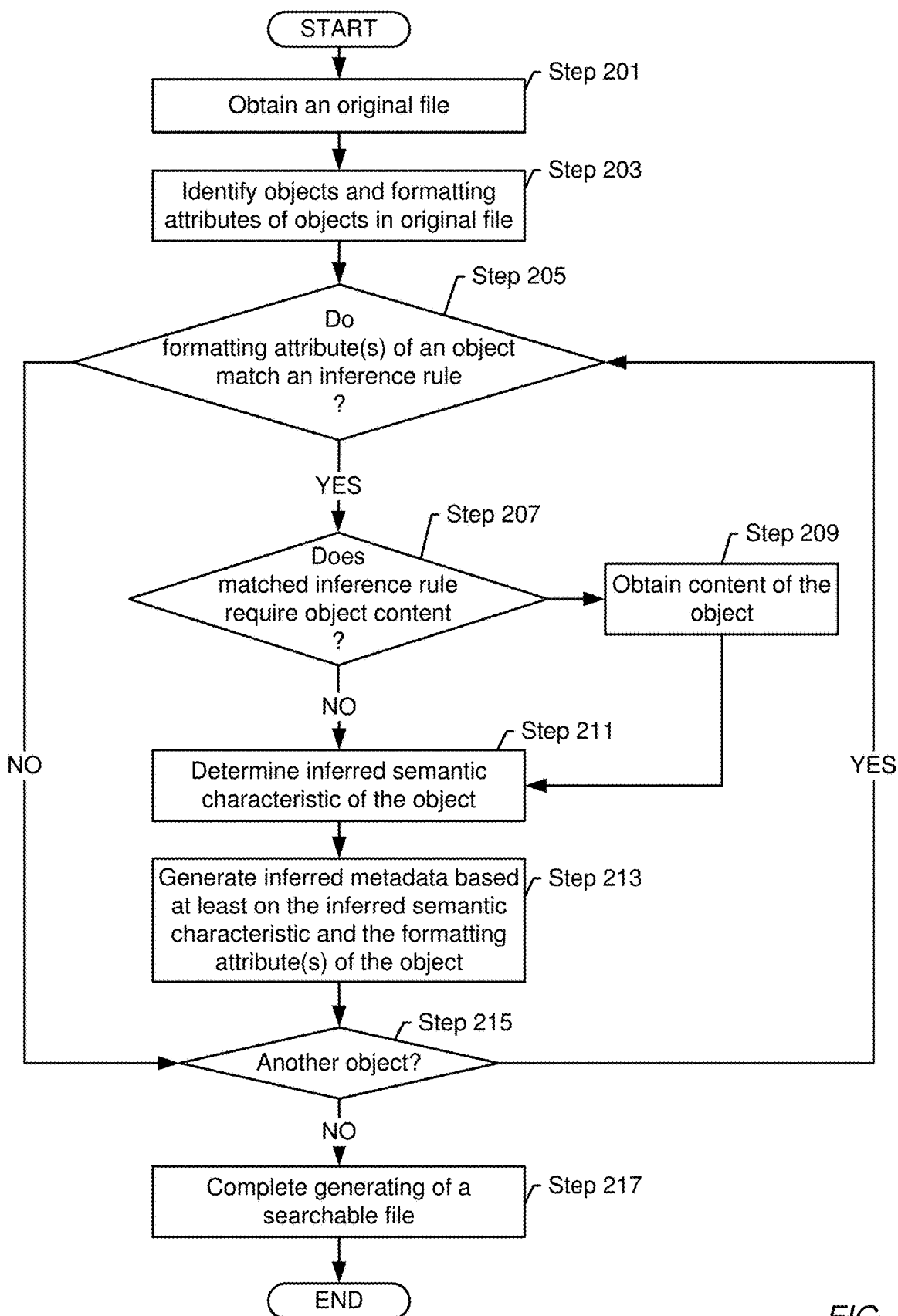
FIGS. 2 and 3A-3B show flowcharts in accordance with one or more embodiments of the invention.
Figure 3A:
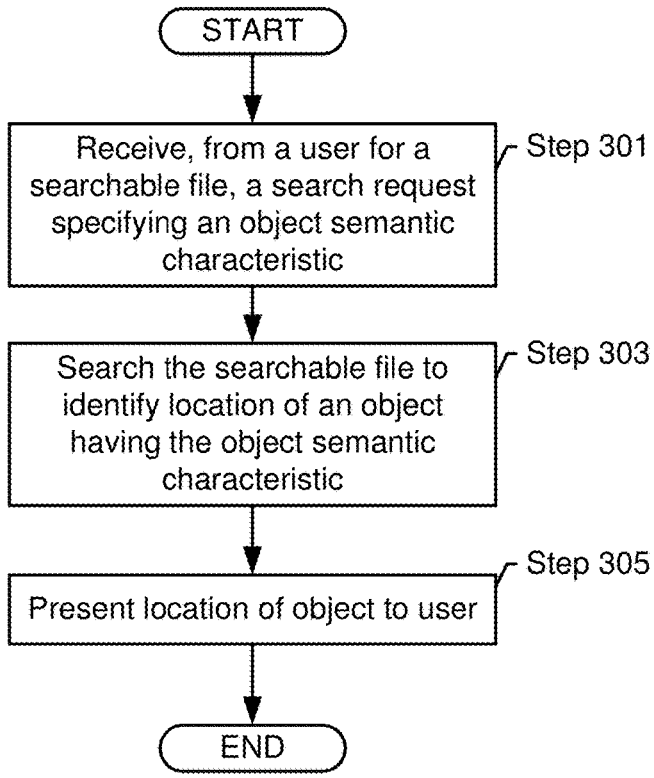
Figure 3B:
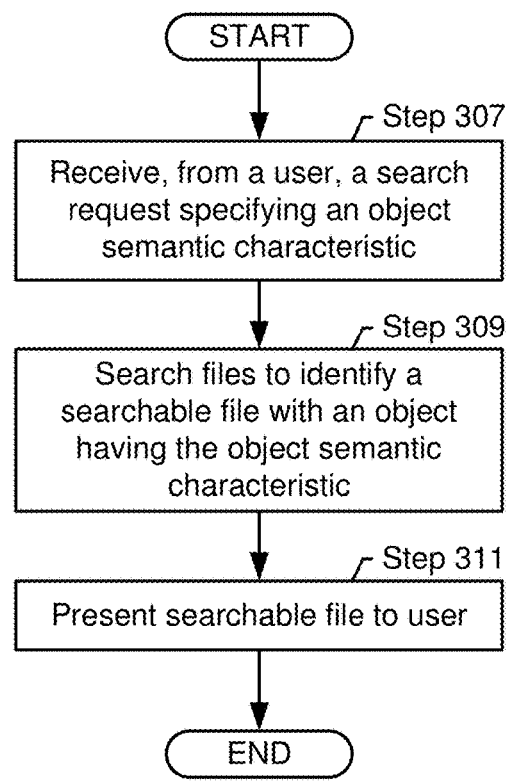

FIGS. 2, 3A, and 3B show flowcharts in accordance with one or more embodiments of the invention. While the various steps in these flowcharts are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for generating a searchable file in accordance with one or more embodiments of the invention. In Step 201, an original file is obtained. The original file may be a structured file or a unstructured file. Specifically, a user may initiate an inference application with an identifier of the original file. For example, the original file may be opened using a program that interprets and displays the original file and the user may request that the opened file be analyzed using the inference application. In other words, the user may request inference analysis through the program. By way of another example, the user may select the original file and request, through an operating system interface, that the file be analyzed using the inference application. In other words, the user may request inference analysis through the operating system. In some embodiments, the user may request or have a default parameter set to store inferred metadata. In some alternative embodiments, inferred metadata is always stored. As used herein, a user requests inference analysis when the user directly or indirectly (e.g., through a script) initiates the inference analysis. Once the user requests the inference analysis, the original file is passed to the inference application.

In Step 203, objects and formatting attributes of objects are identified in the original file in one or more embodiments of the invention. In one or more embodiments where the original file is a structured file, identifying objects and the formatting attributes of the objects may be performed by parsing the original file and extracting objects delimited by tags. In one or more embodiments where the original file is a unstructured file, the original file may be objectified to identify objects and the formatting attributes of the objects.

In Step 205, a determination is made as to whether the formatting attribute(s) of an object matches an inference rule. If the determination is negative, i.e., the formatting attribute(s) of the object does not match any inference rule, the method proceeds to Step 215. If the determination is positive, i.e., the formatting attribute(s) of the object matches at least one inference rule, the method proceeds to Step 207.

In Step 207, a determination is made as to whether the matched inference rule includes a condition based on content of the object. If the determination is negative, i.e., the matched inference rule does not include any condition based on content of the object, the method proceeds to Step 211. If the determination is positive, i.e., the matched inference rule includes a condition based on content of the object, the method proceeds to Step 209 before continuing on to Step 211.

In Step 209, content of the object is obtained. For a text object, the content is obtained directly from the object. The non-objectified or non-text objects include images, where image files are extracted and analyzed. In one or more embodiments, the image files are analyzed using image recognition and/or comparison techniques to identify keywords with best matches to the images. In one or more embodiments, the image recognition and/or comparison techniques are based on machine learning algorithms. The matched keywords are used as the content of the image object. The non-objectified or non-text objects may also be associated with tags describing their object characteristic. For example, in OOXML, a tag may describe a TABLE object, with its content and formatting characteristics. In one or more embodiments, the tags are analyzed to identify keywords with best matches to their content and/or formatting characteristics. The matched keywords are used as the content of the tagged object.

In Step 211, an inferred semantic characteristic of the object is determined using the matched inference rule. In one or more embodiments, the matched inference rule is used to evaluate the formatting attribute(s) and/or the content of the object to estimate a purpose and/or a content description of the object as intended by the author. In one or more embodiments, the inferred semantic characteristic also includes a confidence measure of the estimation.

In Step 213, inferred metadata is generated for the object based at least on the inferred semantic characteristic and the formatting attribute(s) in one or more embodiments of the invention. In particular, the inferred metadata includes representation of one or more portions of the inferred semantic characteristic and the formatting attribute(s). In one or more embodiments of the invention, the inferred metadata has individual words in a human language (as opposed to computer languages). Thus, the inferred metadata may be searched using human language based search strings. The inferred metadata is added to the original file to generate the processed file that is searchable based on semantic characteristics. In this context, the processed file is referred to as a searchable file or a semantic-searchable file. Further, the location contained in the formatting attribute(s) may be linked to the inferred metadata in the searchable file. In one or more embodiments, the searchable file is an Office Open XML file, PDF file, or PDL file.

In one or more embodiments of the invention, the inferred metadata is stored in a separate part of the searchable file. In one or more embodiments, the inferred metadata is embedded in the searchable file with the object. In other words, the inferred metadata may be added to the searchable file next to (or above/below) the object in the searchable file. The inferred metadata may be added such that the inferred metadata is not interpreted by the viewer when displaying the original document content. In one or more embodiments of the invention, the inferred metadata may be added as hidden content to the searchable file. Hidden content corresponds to document content that is not displayed.

Although Step 205 through Step 213 disclose a single matched inference rule, multiple matched inference rules may be associated with the same object. In such embodiments, inferred metadata for each matched inference rule may be added to the searchable file.

In Step 215, a determination is made whether another unanalyzed object exists. In particular, each object is analyzed to determine whether one or more inference rules match the object. If the determination is made that another unanalyzed object exists, then the method returns to Step 205 to analyze the next object. If no other unanalyzed object exists, then generation of the searchable file is completed in Step 217. Once completed, the searchable file may be viewed and searched.

In the flowchart explained above, the searchable file is once generated, and the inferred metadata is added to such generated searchable file. However, the present invention is not limited to this specific implementation. For instance, the generation of the searchable file can be deferred until the Step 217 is executed. In this case, the inferred metadata are once stored in memory areas, and then are compiled into the searchable file.

FIG. 3A shows a flowchart for searching in a searchable file for an object having a particular semantic characteristic. A search request and find request are the same as used herein and refer to any string query in one or more files for one or more matches to the string in the query.

In Step 301, a search request specifying a semantic characteristic of an object (i.e., object semantic characteristic) is received from a user. In one or more embodiments of the invention, the user may open the searchable file in the file viewer. The user may open a search dialog box in the file viewer and type in a search string specifying an object semantic characteristic. For example, if the user is searching for word art but does not remember any particular word in the word art, the user may enter "word art" in the search dialog box. In one or more embodiments of the invention, the inferred semantic characteristic is added to the searchable file such that existing (e.g., legacy) search engines may search the inferred semantic characteristic.

In Step 303, the searchable file is searched to identify the location of an object having the object semantic characteristic. In one or more embodiments of the invention, the viewer search engine searches through the inferred metadata to identify a match with the search string. In performing the search, the viewer search engine may search the entire searchable file, including the searchable file content. Alternatively, the viewer search engine may just search the inferred metadata. In one or more embodiments of the invention, when a match is found, the file viewer obtains the location. The location may be explicitly specified in the inferred metadata or identified based on the location of the inferred metadata.

In Step 305, the location of the object is presented to the user in one or more embodiments of the invention. Presenting the location may include highlighting the object corresponding to the matching inferred metadata and/or listing the location by page and position on the page. Alternatively or additionally, presenting the location may include centering the current display on the object. Other techniques for listing the location may be used without departing from the scope of the claims.

FIG. 3B shows a flowchart for searching for a document having an object with a specified object semantic characteristic. In Step 307, a search request specifying an object semantic characteristic is received from a user in one or more embodiments of the invention. For example, the user may open a file search engine dialog box in the operating system. Using the file search engine, the user may specify optional parameters (e.g., components of file metadata) and a search string specifying object semantic characteristic. Entering the search string may be performed as discussed above in Step 301.

In Step 309, files are searched to identify a searchable file with the object semantic characteristic in one or more embodiments of the invention. In particular, each file is searched by the file search engine to identify the file that matches the optional parameters and has an object with the object semantic characteristic. Searching for a matching object semantic characteristic may be performed as discussed above.

In Step 311, the searchable file is presented to the user in one or more embodiments of the invention. Specifically, when a match is found, the matching searchable file or a link to the matching searchable file may be displayed for the user.

As shown by FIGS. 3A and 3B, one or more embodiments allow for searching a searchable file not only for the document content, but also for semantic characteristics in the original file. Thus, the user is able to search author-defined semantic characteristics that are not explicitly expressed in the text of the original file.

FIGS. 4A-4E show an example in accordance with one or more embodiments of the invention. The following example is for explanatory purposes only and not intended to limit the scope of the invention. The example related to structured and unstructured document content that may be analyzed, objects identified, and tagged information associated with these objects. This disclosure adds an enhancement of additional analysis of the document content to infer semantic characteristics of document objects. Then, this inferred data is added to the total of metadata that are added as invisible, searchable text in proximity to their associated document objects.

Figure 4A:
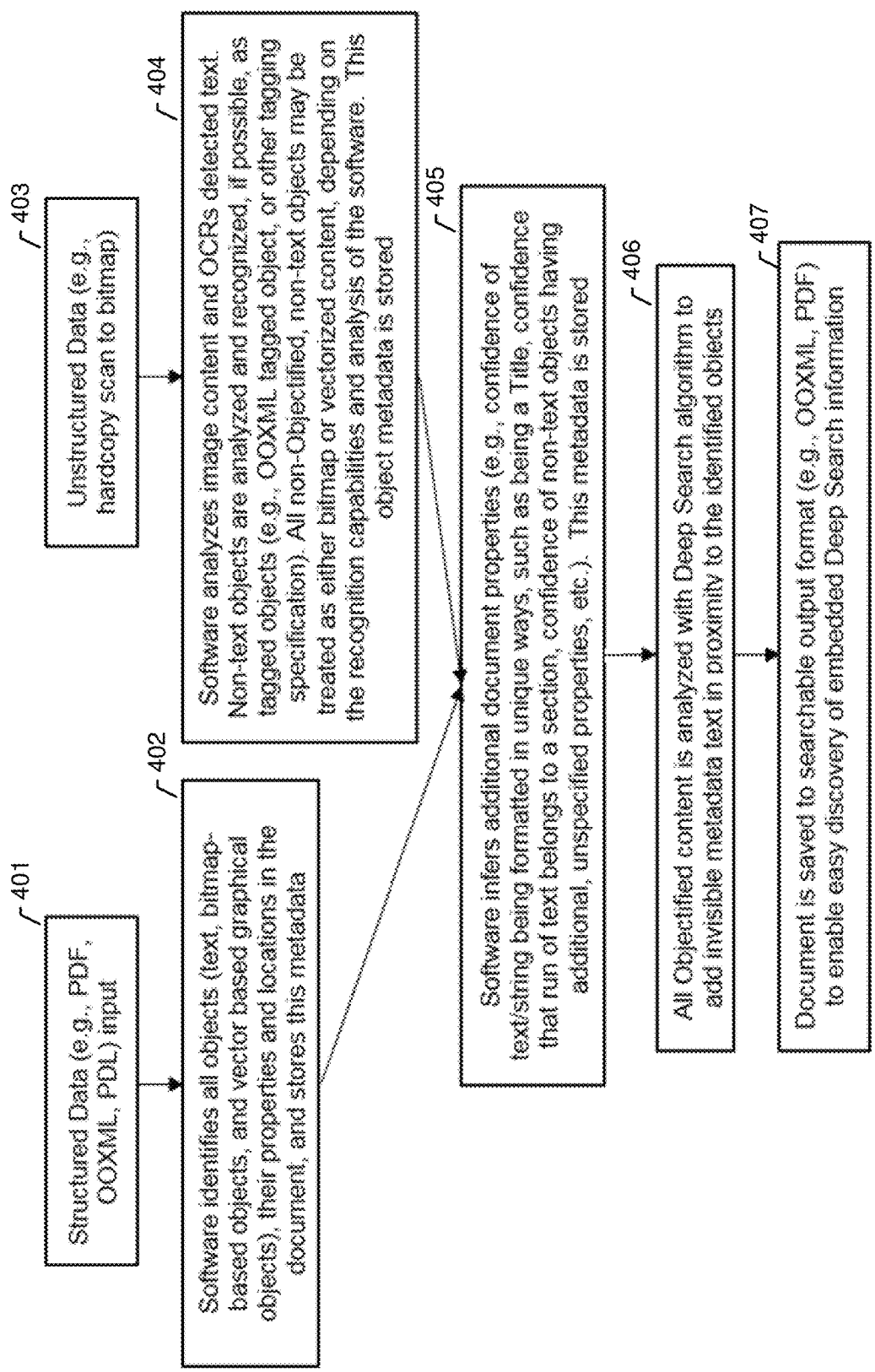
FIGS. 4A-4E show an example in accordance with one or more embodiments of the invention.

FIG. 4A shows a flow diagram of the operation of an inference application. As shown in FIG. 4A, structured input (e.g., MS Word™ document) is analyzed via a software application in Block 401. All object content (e.g., text, image, border) is recognized and tagged information is associated with these objects in Block 402. Next, document properties, not specified via the OOXML specification, are inferred in Block 405. One possible property to be identified includes text/strings that are likely "Title" text. Text/strings identified as "Title" may convey the theme of the overall document content.

Figure 4B:
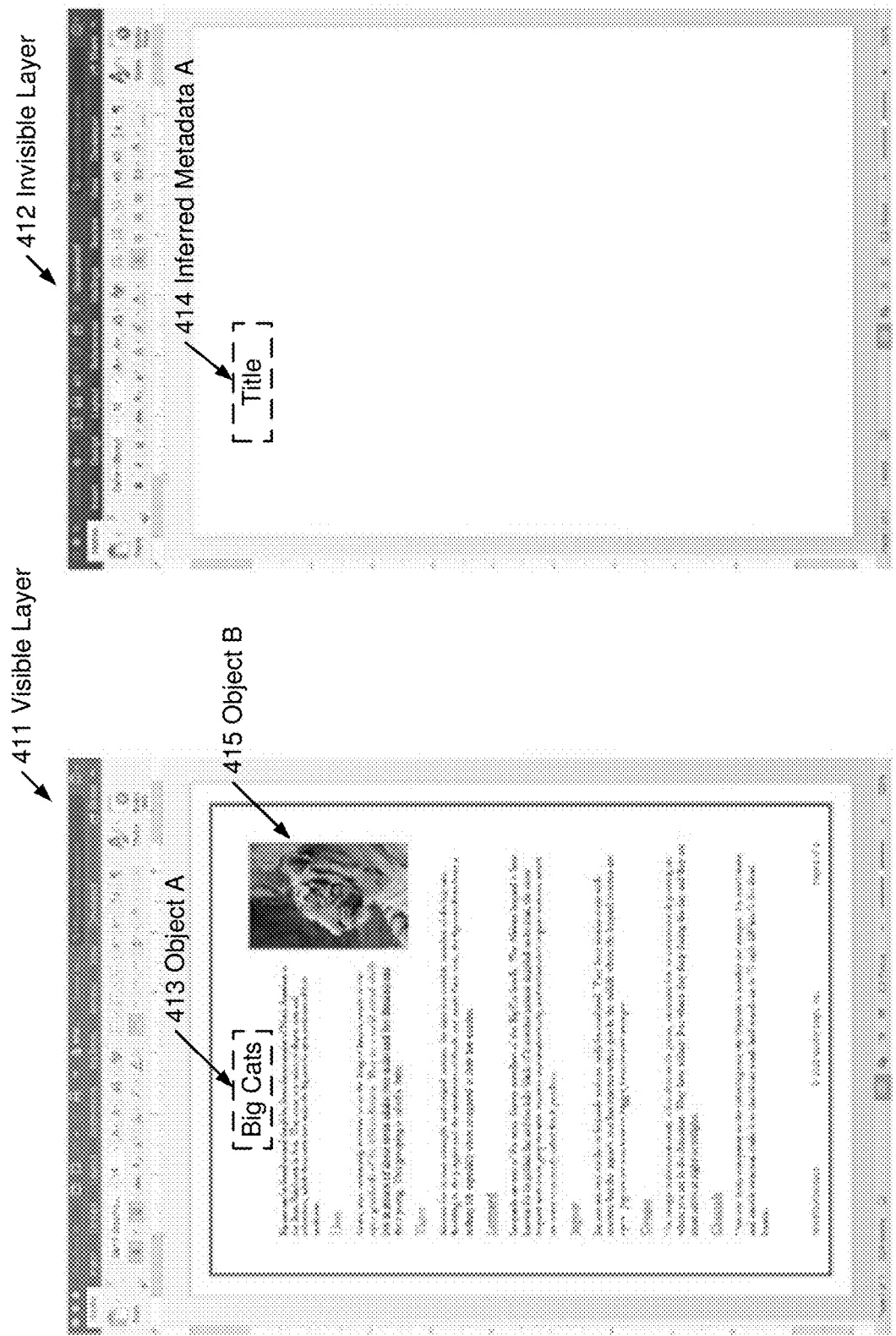

An example is shown in FIG. 4B where an object A (413) is identified, in the visible layer (411) of a document, as the "Title" text. The object A (413) is identified based on an inference rule (such as relative font size, centered v.s. left justified formatting, Bold v.s. Normal font formatting, etc.) that assigns relative weights to the likelihood that the text/strings "Big Cats" in the object A (413) are part of the "Title". In other words, the inference application determines that the object A (413) has an inferred semantic characteristic of being the "Title" of the document. Accordingly, inferred metadata A (414) is generated for the object A (413) that describes the text/strings "Big Cats" as "Title". In particular, this inference may not depend on the document's filename, which does not refer to "big" or "cats". For example, the inference rule may be based on the heuristics that the object A (413) is at the top of the page, centered, larger in font size compared to the rest of the document text, etc., and therefore, has the largest normalized value "Title_confidence" of any string within the document. For example, the heuristics may normalize the value "Title_confidence" on a scale of 0 to 1, where a 0 value is unlikely to be a "Title", while a 1 is confident of being a "Title". The Microsoft Word™ document itself, however, does not have any mechanisms to designate this text as a "Title", so inference of this property is performed. Similarly, for other popular electronic document formats (e.g., PDF, MS PowerPoint, MS Excel™), there is no native mechanisms to designate strings as "Titles", so inference is needed for this type of property, as well.

Further, as shown in FIG. 4B, this inferred metadata A (414) is embedded in the invisible layer (412) of the document as invisible, searchable text, in proximity to the text object A (413). For example, the inferred metadata A (414) may include the textual data "Title", such that the document is a searchable document. Although the visible layer (411) and invisible layer (412) are shown separately in FIG. 4B, the visible layer (411) and invisible layer (412) may be viewed in a stacked format where the inferred metadata A (414) is in proximity to the text object A (413).

Figure 4C:
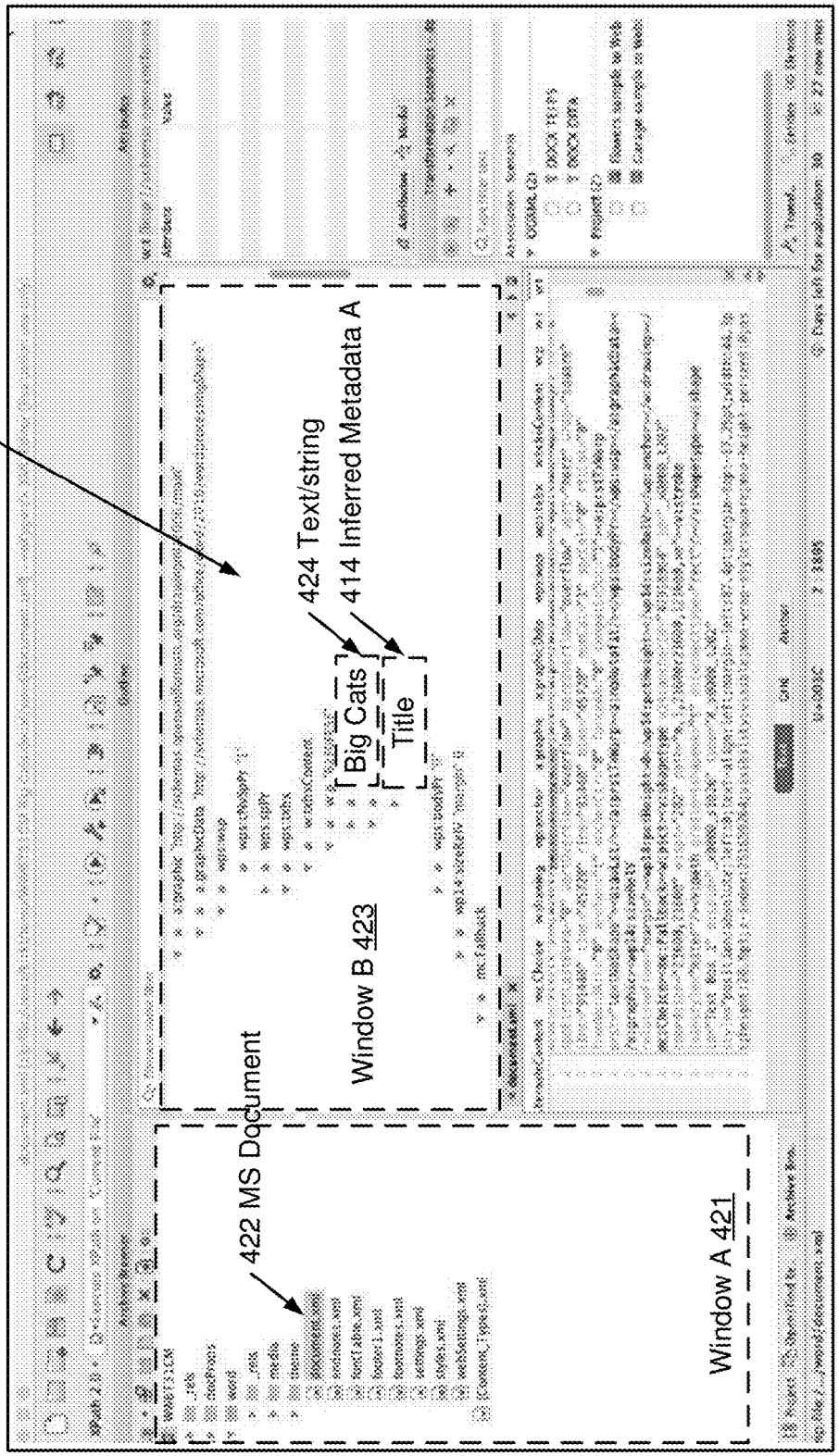

FIG. 4C shows an example of embedding inferred metadata in OOXML data within the MS WORD™ document. Specifically, FIG. 4C shows a screenshot A (420) having a file browser window A (421) where the MS document (422) is selected and highlighted. In particular, the MS document (422) corresponds to the document depicted in FIG. 4B above. Correspondingly, the window B (423) displays the OOXML data (424) of the selected MS document (422) where the inferred metadata A (414) is embedded in proximity to the text/strings (424) "Big Cats" within the OOXML data (424). Once embedded with the inferred metadata A (414), the MS document (422) can be saved as the aforementioned searchable file back out to MS Word™ (or some other document format) in the file system.

The user may then search for information within the MS document (422) in the file system. The user may search for "big AND cats" (e.g., using the Windows search tool in a Windows operating system) and find documents with this string. The user may get multiple search hits. With embedded inferred metadata in the document, the user may refine the search to "big AND cats AND Title". This refined search criteria reduces the number of document candidates, speeding up the search process for the user, which improves the performance and efficiency of the underlying computing system.

Figure 4D:
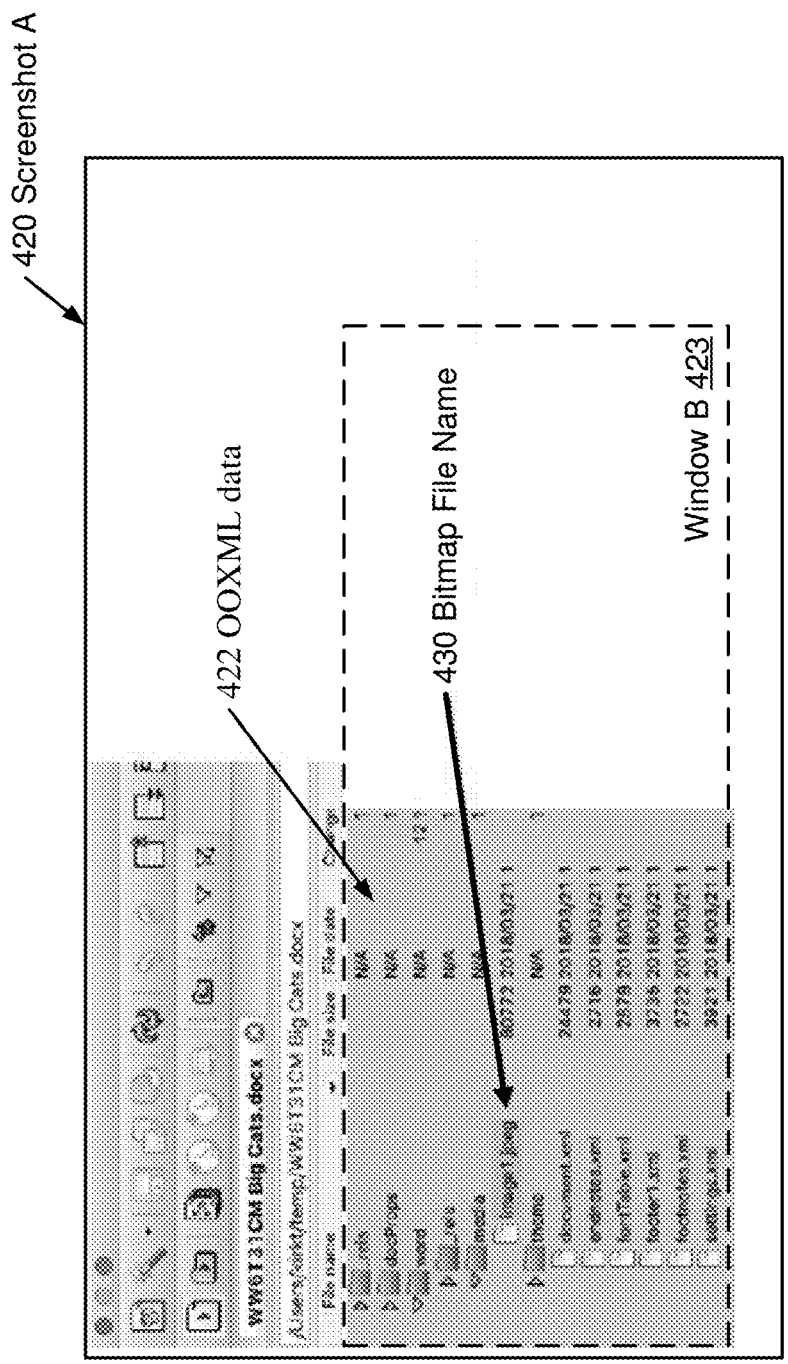
Figure 4E:
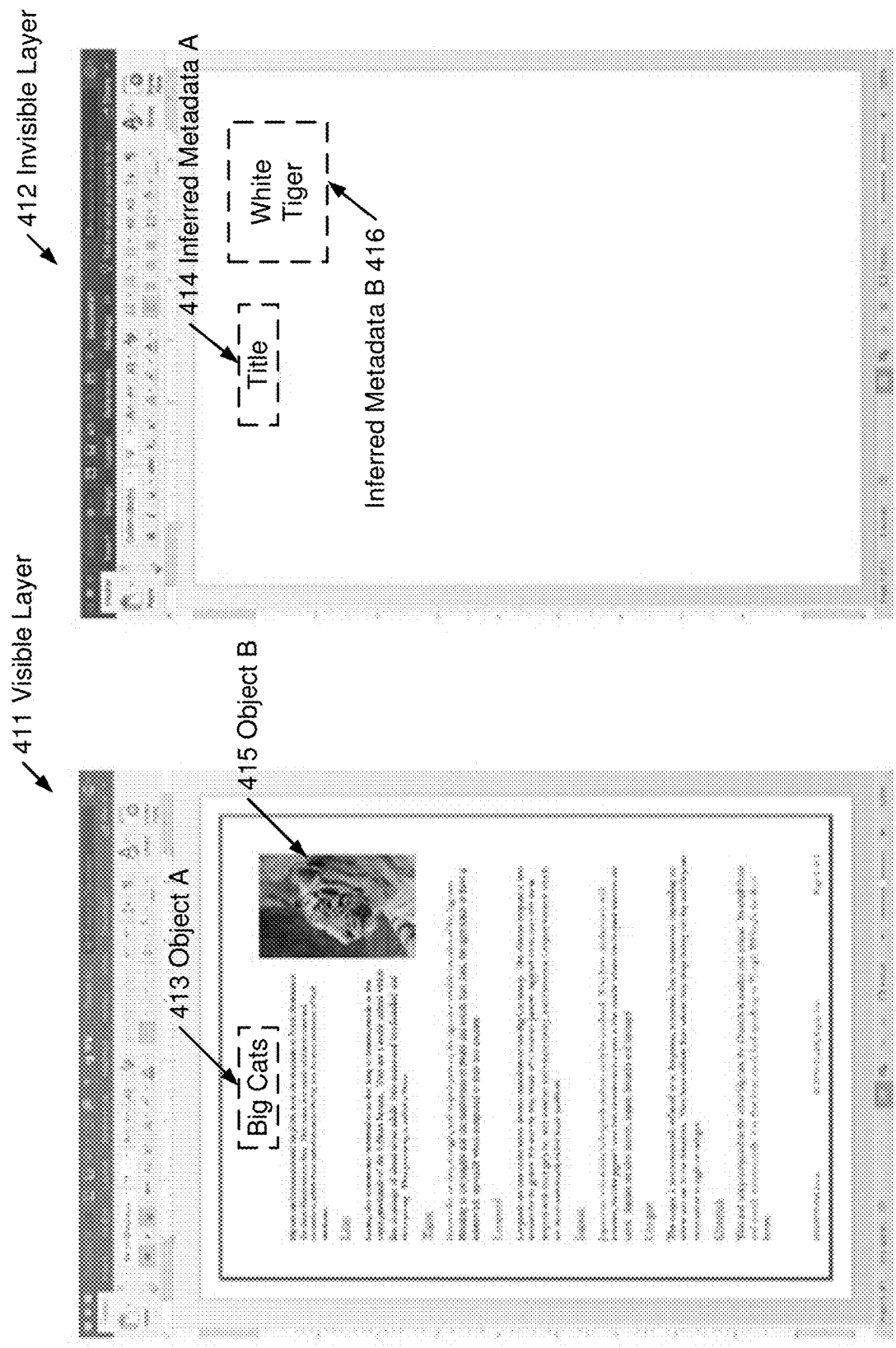

FIGS. 4D and 4E shows another aspect of the example described above. The inference application identifies all text and non-text objects in the MS document (422). This includes the object B (415) in the visible layer (411) depicted in FIG. 4B above. In particular, the object B (415) includes a bitmap-based file. FIG. 4D shows a portion of the OOXML data (424) containing the bitmap file name (430) "image I.jpeg". Using image recognition techniques, the inference application determines that the content of the object B (415) is an image of a big cat, specifically a white tiger. In other words, the inference application determines that the semantic characteristic of the object B (415) is a big cat and, in particular, a white tiger. For example, the inference application extracts the image file and analyzes the content of the image to determine that the keywords "white tiger" best matches the image. As shown in FIG. 4E, the inference application embeds the keywords "white tiger" as inferred metadata B (416) near the object B (415). In particular, FIG. 4E is an extension of FIG. 4B. Similar to FIG. 4B, the visible layer (411) and invisible layer (412) depicted in FIG. 4E may be viewed in a stacked format where the inferred metadata B (416) is in proximity to the graphics object B (415).

Once embedded with the inferred metadata B (416), the MS document (422) can be saved back out to MS Word™ (or some other document format) in the file system. The user may then search for information within this document in the file system. The user may search for Word documents that contain "cat OR tiger OR white" and likely have a small set of files to review as part of the search, resulting in less computing resources and shorter run time to find the content of interest.

Figure 5:
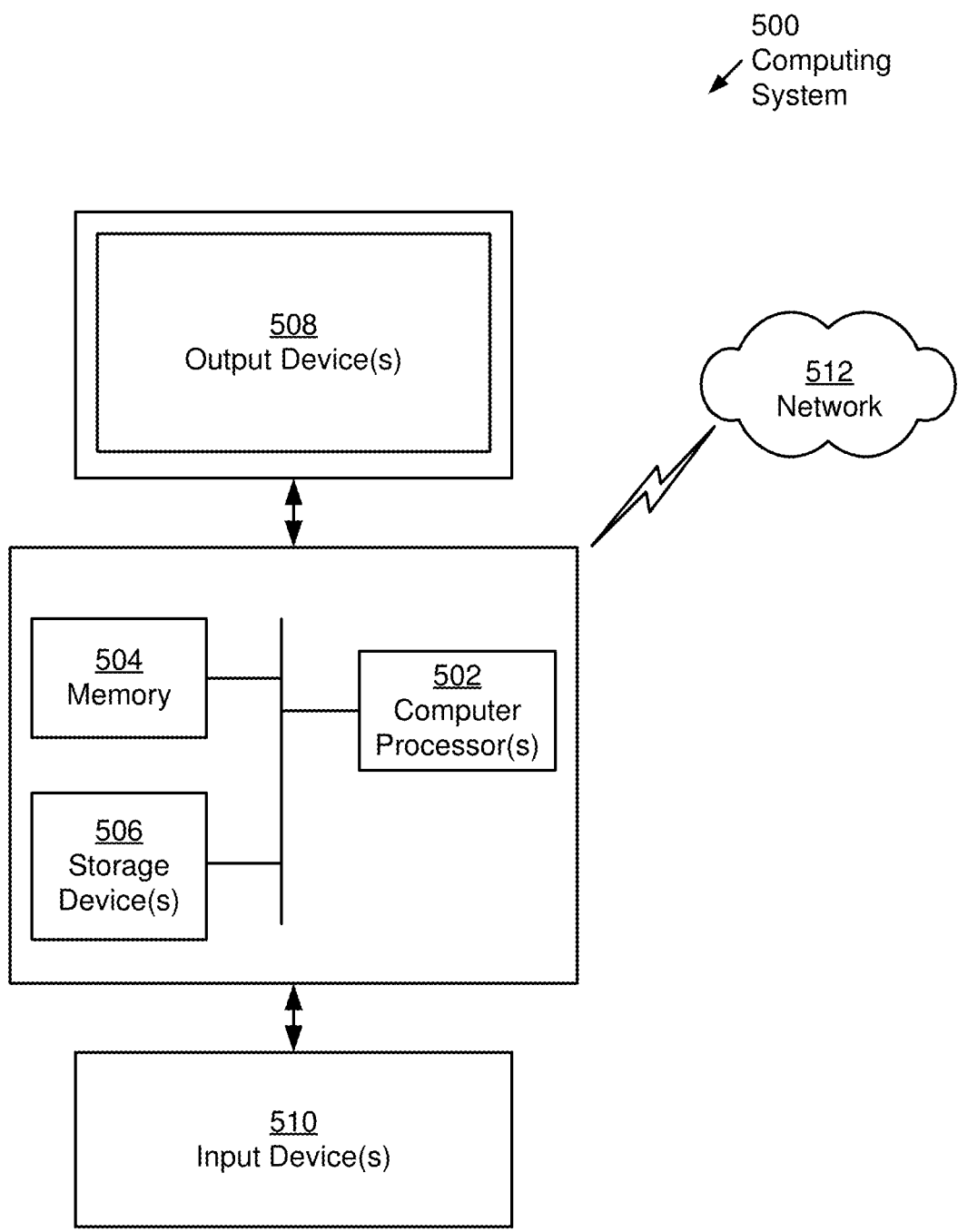
FIG. 5 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating an output processed file, that is an electronic searchable file, from an input original document, the method comprising:
    identifying an object within the original document and a formatting attribute of the object;
    determining an inferred semantic characteristic of the object by comparing the formatting attribute with a plurality of inference rules, wherein the inferred semantic characteristic describes a purpose of the object in the original document and comprises an estimation of author-defined semantic characteristic of the object;
    detecting location coordinates of the object in a visible layer of the original document;
    generating the processed file, where the processed file includes:
        a visible layer of the processed file that includes the object from the original document, where location coordinates of the object in the visible layer of the processed file correspond to the location coordinates of the object in the original document; and
        an invisible layer of the processed file that overlaps the visible layer of the processed file in a stacked format;
    generating metadata based at least on the inferred semantic characteristic and the formatting attribute of the object, wherein the metadata comprises text data that is searchable by a search application for the processed file to identify the object within the processed file; and
    adding the metadata to the invisible layer of the processed file such that:
        location coordinates of the metadata in the invisible layer of the processed file correspond to the location coordinates of the object in the visible layer of the processed file; and
        the metadata in the invisible layer of the processed file overlaps the object in the visible layer of the processed file.

2. The method of claim 1, wherein determining the inferred semantic characteristic of the object is further by comparing a content of the object with the plurality of inference rules.

3. The method of claim 1, wherein the original document comprises at least one selected from a group consisting of a structured document and an unstructured document.

4. The method of claim 1, wherein the processed file is an Office Open XML file.

5. The method of claim 1, wherein the inferred semantic characteristic further comprises a confidence measure of the estimation.

6. The method of claim 1,
    wherein the object comprises at least one selected from a group consisting of a graphics object and a text object,
    wherein the formatting attribute describes at least one selected from a group consisting of a location, a shape, a size, and a font of the object in the original document, and
    wherein the inferred semantic characteristic further describes a content description of the object in the original document.

7. The method of claim 1, wherein generating the metadata comprises storing the location coordinates of the object in the original document in the metadata.

8. The method of claim 7, further comprising:
    receiving a search request comprising a description of the object;
    searching the processed file to identify the text data that matches the description; and
    retrieving, in response to identifying the text data, the location coordinates of the object in the original document from the metadata.

9. The method of claim 1, further comprising:
    receiving a search request comprising a description of the object;
    searching, in a plurality of searchable files comprising the processed file, to identify the text data that matches the description; and
    returning in response to identifying the text data, an identifier of the processed file.

10. A system for generating an output processed file, that is an electronic searchable file from an input original document, the system comprising:
    a computer processor; and
    memory coupled to the computer processor and storing instructions, when executed, causing the computer processor to:
        identify an object within the original document and a formatting attribute of the object;
        determine an inferred semantic characteristic of the object by comparing the formatting attribute with a plurality of inference rules, wherein the inferred semantic characteristic describes a purpose of the object in the original document and comprises an estimation of author-defined semantic characteristic of the object;
        detect location coordinates of the object in a visible layer of the original document;
        generate the processed file, where the processed file includes:
            a visible layer of the processed file that includes the object from the original document, where location coordinates of the object in the visible layer of the processed file correspond to the location coordinates of the object in the original document; and
            an invisible layer of the processed file that overlaps the visible layer of the processed file in a stacked format;
        generate metadata based at least on the inferred semantic characteristic and the formatting attribute of the object, wherein the metadata comprises text data that is searchable by a search application for the processed file to identify the object within the processed file; and add the metadata to the invisible layer of the processed file such that:

location coordinates of the metadata in the invisible layer of the processed file correspond to the location coordinates of the object in the visible layer of the processed file; and the metadata in the invisible layer of the processed file overlaps the object in the visible layer of the processed file.

11. The system of claim 10, wherein determining the inferred semantic characteristic of the object is further by comparing a content of the object with the plurality of inference rules.

12. The system of claim 10, wherein the inferred semantic characteristic further comprises a confidence measure of the estimation.

13. The system of claim 10, wherein generating the metadata comprises storing the location coordinates of the object in the original document in the metadata.

14. The system of claim 13, the instructions, when executed, further causing the computer processor to:

receive a search request comprising a description of the object;

search the processed file to identify the text data that matches the description; and retrieve, in response to identifying the text data, the location coordinates of the object in the original document from the metadata.

15. The system of claim 10, the instructions, when executed, further causing the computer processor to:

receive a search request comprising a description of the object;

search, in a plurality of searchable files comprising the processed file, to identify the text data that matches the description; and return in response to identifying the text data, an identifier of the processed file.

16. A non-transitory computer readable medium comprising instructions for generating an output processed file, that is an electronic searchable file from an input original document, the instructions, when executed, being configured to:

identify an object within the original document and a formatting attribute of the object;

determine an inferred semantic characteristic of the object by comparing the formatting attribute with a plurality of inference rules, wherein the inferred semantic characteristic describes a purpose of the object in the original document and comprises an estimation of author-defined semantic characteristic of the object;

detect location coordinates of the object in a visible layer of the original document;

generate the processed file, where the processed file includes:

a visible layer of the processed file that includes the object from the original document, where location coordinates of the object in the visible layer of the processed file correspond to the location coordinates of the object in the original document; and an invisible layer of the processed file that overlaps the visible layer of the processed file in a stacked format;

generate metadata based at least on the inferred semantic characteristic and the formatting attribute of the object, wherein the metadata comprises text data that is searchable by a search application for the processed file to identify the object within the processed file; and add the metadata to the invisible layer of the processed file such that:

location coordinates of the metadata in the invisible layer of the processed file correspond to the location coordinates of the object in the visible layer of the processed file; and the metadata in the invisible layer of the processed file overlaps the object in the visible layer of the processed file.

17. The non-transitory computer readable medium of claim 16, wherein determining the inferred semantic characteristic of the object is further by comparing a content of the object with the plurality of inference rules.

18. The non-transitory computer readable medium of claim 16, the instructions, when executed, are further configured to:

receive a search request comprising a description of the object;

search, in a plurality of searchable files comprising the processed file, to identify the text data that matches the description; and return in response to identifying the text data, an identifier of the processed file.

19. The method of claim 1, wherein the plurality of inference rules includes an alignment format comparison, a relative font size comparison, or a font format comparison.

20. The method of claim 1, further comprising:

determining the object is a title of the original document when the location coordinates of the object are centered at the top of the original document and a font size of the object is larger than a font size of other objects in the original document, wherein the text data of the metadata identifies the object as the title.

21. The method of claim 1, further comprising:

receiving a search request for a title of the original document;

searching, in a plurality of searchable files comprising the processed file, to identify the text data that identifies the title of the original document; and returning, in response to identifying the text data, an identifier of the processed file.

22. The non-transitory computer readable medium of claim 16, wherein the plurality of inference rules includes an alignment format comparison, a relative font size comparison, or a font format comparison.

23. The non-transitory computer readable medium of claim 16, wherein the instructions, when executed, are further configured to:

determine the object is a title of the original document when the location coordinates of the object are centered at the top of the original document and a font size of the object is larger than a font size of other objects in the original document, wherein the text data of the metadata identifies the object as the title.

24. The non-transitory computer readable medium of claim 16, wherein the instructions, when executed, are further configured to:

receive a search request for a title of the original document;

search, in a plurality of searchable files comprising the processed file, to identify the text data that identifies the title of the original document; and return, in response to identifying the text data, an identifier of the processed file.

25. The method of claim 1, further comprising:

receiving a search request comprising a description of the object;

searching the processed file to identify the text data that matches the description; and retrieving, in response to identifying the text data, the location coordinates of the object by using the location coordinates of the metadata in the invisible layer.

26. The system of claim 10, the instructions, when executed, further causing the computer processor to:

receive a search request comprising a description of the object;

search the processed file to identify the text data that matches the description; and retrieve, in response to identifying the text data, the location coordinates of the object by using the location coordinates of the metadata in the invisible layer.

\* \* \* \* \*